US012113271B2

(12) United States Patent
Zimmerman et al.

(10) Patent No.: US 12,113,271 B2
(45) Date of Patent: Oct. 8, 2024

(54) METROCELL ANTENNA ASSEMBLIES AND UTILITY POLE ASSEMBLIES AND BASE STATIONS INCLUDING SAME

(71) Applicant: Outdoor Wireless Networks LLC, Claremont, NC (US)

(72) Inventors: Martin Zimmerman, Chicago, IL (US); Julian R. Colapietro, McKinney, TX (US); Wenkang Wang, Suzhou (CN); Yan Wang, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 745 days.

(21) Appl. No.: 17/044,747

(22) PCT Filed: Nov. 8, 2019

(86) PCT No.: PCT/CN2019/116618
§ 371 (c)(1),
(2) Date: Oct. 1, 2020

(87) PCT Pub. No.: WO2021/087957
PCT Pub. Date: May 14, 2021

(65) Prior Publication Data
US 2023/0109598 A1 Apr. 6, 2023

(51) Int. Cl.
*H01Q 1/24* (2006.01)
*H01Q 1/12* (2006.01)

(52) U.S. Cl.
CPC ........... *H01Q 1/246* (2013.01); *H01Q 1/1207* (2013.01); *H01Q 1/1242* (2013.01)

(58) Field of Classification Search
CPC .... H01Q 1/246; H01Q 1/1207; H01Q 1/1242; H01Q 1/44
See application file for complete search history.

(56) References Cited

U.S. PATENT DOCUMENTS 9,325,061 B2 4/2016 Rucki et al.
11,114,751 B2 * 9/2021 Chase .................. H01Q 1/1242
11,605,881 B2 * 3/2023 Nemeth, III ............. H01Q 1/42
2004/0174317 A1 9/2004 Dearnley et al.
2012/0299796 A1 11/2012 Angseryd
(Continued)

FOREIGN PATENT DOCUMENTS

CN 202050047 U 11/2011
CN 206401490 U 8/2017
(Continued)

OTHER PUBLICATIONS

Gamma Nu Conduit Antenna (Dec. 12, 2018).
(Continued)

*Primary Examiner* — Seokjin Kim
(74) *Attorney, Agent, or Firm* — Myers Bigel, P.A.

(57) ABSTRACT

A metrocell utility pole assembly includes a utility pole, an auxiliary device, and a metrocell antenna assembly. The utility pole has an upper end. The metrocell antenna assembly includes a support and an antenna module. The support is mounted on the upper end of the utility pole. The support includes an elongate post having a post upper end. The elongate post extends upwardly from the upper end of the utility pole to the post upper end. The antenna module includes an enclosure and an antenna. The enclosure defines an enclosure passage extending vertically through the enclosure. The antenna is disposed in the enclosure. The post extends through the enclosure passage. The auxiliary device is mounted on the upper end of the post.

16 Claims, 7 Drawing Sheets

(56) References Cited

U.S. PATENT DOCUMENTS

| | | | | |
|---|---|---|---|---|
| 2016/0365624 | A1 | 12/2016 | Maley et al. | |
| 2017/0279187 | A1* | 9/2017 | Lockwood | H01Q 1/42 |
| 2018/0219278 | A1* | 8/2018 | Wigdahl | H01Q 1/1242 |
| 2018/0227775 | A1* | 8/2018 | Bisiules | H01Q 1/246 |
| 2018/0351245 | A1* | 12/2018 | Constance | H01Q 1/245 |
| 2019/0296421 | A1 | 9/2019 | Wang et al. | |
| 2020/0182441 | A1* | 6/2020 | Girouard | F21V 29/83 |
| 2021/0257719 | A1* | 8/2021 | Willemse | H01Q 1/44 |
| 2023/0146405 | A1* | 5/2023 | Lalos | G06F 3/041 455/575.7 |

FOREIGN PATENT DOCUMENTS

| | | | |
|---|---|---|---|
| CN | 206989133 | U | 2/2018 |
| CN | 207994037 | U | 10/2018 |
| CN | 110299597 | A | 10/2019 |
| CN | 209607902 | U | 11/2019 |
| EP | 3998678 | A1 | 5/2022 |
| KR | 20060041167 | A | 5/2006 |
| KR | 20180088075 | A | 8/2018 |
| WO | 2019007444 | A2 | 1/2019 |
| WO | 2020060819 | A1 | 3/2020 |

OTHER PUBLICATIONS

Notification of Transmittal of the International Search Report and the Written Opinion of the International Searching Authority, or the Declaration, in corresponding PCT Application No. PCT/CN2019/116618 (Aug. 11, 2020).

* cited by examiner

METROCELL ANTENNA ASSEMBLIES AND UTILITY POLE ASSEMBLIES AND BASE STATIONS INCLUDING SAME

CROSS REFERENCE TO RELATED APPLICATIONS

The present application is a 35 U.S.C. 371 national stage application of PCT International Application No. PCT/CN2019/116618, filed on Nov. 8, 2019, the entire disclosure of which is incorporated herein by reference.

FIELD

The present invention relates to cellular communications systems and, more particularly, to metrocell base station antennas for cellular communications systems.

BACKGROUND

Cellular communications systems are well known in the art. In a typical cellular communications system, a geographic area is divided into a series of regions that are referred to as "cells", and each cell is served by a base station. Typically, a cell may serve users who are within a distance of, for example, 2-20 kilometers from the base station. The base station may include baseband equipment, radios and antennas that are configured to provide two-way radio frequency ("RF") communications with fixed and mobile subscribers ("users") that are positioned throughout the cell. In many cases, the cell may be divided into a plurality of "sectors" in the azimuth (horizontal) plane, and separate antennas provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

In order to increase capacity, cellular operators have been deploying so-called "metrocell" cellular base stations (which are also often referred to as "small cell" base stations). A metrocell base station refers to a low-power base station that has a much smaller range than a typical "macro cell" base station. A metrocell base station may be designed to serve users who are within, for example about five hundred meters of the metrocell antenna, although many metrocell base stations provide coverage to smaller areas such as areas having a radius of about 100-200 meters or less. Metrocell base stations are often deployed in high traffic regions within a macro cell so that the macro cell base station can offload traffic to the metrocell base station. Metrocell base stations typically employ an antenna that provides full 360 degree coverage in the azimuth plane and a suitable beamwidth in the elevation plane to cover the designed area of the metrocell.

SUMMARY

According to some embodiments of the invention, a metrocell utility pole assembly includes a utility pole, an auxiliary device, and a metrocell antenna assembly. The utility pole has an upper end. The metrocell antenna assembly includes a support and an antenna module. The support is mounted on the upper end of the utility pole. The support includes an elongate post having a post upper end. The elongate post extends upwardly from the upper end of the utility pole to the post upper end. The antenna module includes an enclosure and an antenna. The enclosure defines an enclosure passage extending vertically through the enclosure. The antenna is disposed in the enclosure. The post extends through the enclosure passage. The auxiliary device is mounted on the upper end of the post.

In some embodiments, the auxiliary device is mounted on the upper end of the post above the antenna module.

In some embodiments, the post is tubular and defines a post passage extending therethrough, and the metrocell utility pole assembly includes an auxiliary cable extending through the post passage to the auxiliary device.

According to some embodiments, the auxiliary device includes a lamp.

In some embodiments, the auxiliary device includes a luminaire.

According to some embodiments, the auxiliary device includes a second antenna.

According to some embodiments, the auxiliary device includes a device selected from the group consisting of a radio, communications equipment, a filter, and an ornamental structure.

In some embodiments, the antenna module includes upper and lower opposed ends, and only the lower end of the antenna module is secured to the utility pole and/or the support.

According to some embodiments, an outer diameter of the post and an inner diameter of the enclosure passage are relatively configured such that an annular gap is defined between the post and the enclosure.

In some embodiments, the support includes a mounting base integral with the post, and the mounting base is secured to the upper end of the utility pole to affix the post to the utility pole.

According to some embodiments, the utility pole has an outer diameter adjacent the antenna module, the antenna module has an outer diameter, and the outer diameters of the utility pole and the antenna module are substantially the same.

In some embodiments, the metrocell antenna assembly includes a mounting bracket coupling a lower end of the enclosure to the upper end of the utility pole such that the lower end of the enclosure and the upper end of the utility pole are axially spaced apart to define an access volume between the lower end of the enclosure and the upper end of the utility pole.

In some embodiments, the metrocell antenna assembly includes an access shroud removably mounted on the metrocell antenna assembly to cover the access volume.

In some embodiments, the utility pole has an outer diameter adjacent the access shroud, the antenna module has an outer diameter, the access shroud has an outer diameter, and the outer diameters of the utility pole, the antenna module, and the access shroud are substantially the same.

According to some embodiments, an antenna feed cable extends through the utility pole to the antenna module.

In some embodiments, the metrocell utility pole assembly includes an RF connector on a bottom wall of the enclosure, and the antenna feed cable is connected to the RF connector.

In some embodiments, the bottom wall of the enclosure is formed of a polymeric material.

According to some embodiments, the post is formed of metal.

In some embodiments, the enclosure forms an environmentally sealed chamber, and the antenna is disposed within the environmentally sealed chamber.

In some embodiments, the enclosure includes a tubular wall formed of an electrically insulating polymeric material defining the enclosure passage.

According to embodiments of the invention, a metrocell base station includes a metrocell utility pole assembly, a baseband unit, and a radio. The metrocell utility pole assembly includes a utility pole, an auxiliary device, and a metrocell antenna assembly. The utility pole has an upper end. The metrocell antenna assembly includes a support and an antenna module. The support is mounted on the upper end of the utility pole. The support includes an elongate post having a post upper end. The elongate post extends upwardly from the upper end of the utility pole to the post upper end. The antenna module includes an enclosure and an antenna. The enclosure defines an enclosure passage extending vertically through the enclosure. The antenna is disposed in the enclosure. The post extends through the enclosure passage. The auxiliary device is mounted on the upper end of the post. The radio is connected to the baseband unit and the antenna.

According to embodiments of the invention, a metrocell antenna assembly for use with a utility pole and an auxiliary device includes a support and an antenna module. The support includes an elongate post having a post upper end. The support is configured to be mounted on an upper end of the utility pole such that the elongate post extends upwardly from the upper end of the utility pole to the post upper end. The antenna module includes an enclosure and an antenna. The enclosure defines an enclosure passage extending vertically through the enclosure and configured to receive the post through the enclosure passage. The antenna is disposed in the enclosure. The support is configured to support the auxiliary device on the upper end of the post.

According to method embodiments of the invention, a method for forming a metrocell utility pole assembly includes: providing a utility pole having an upper end; providing a support including an elongate post having a post upper end; mounting the support on the upper end of the utility pole such that the elongate post extends upwardly from the upper end of the utility pole to the post upper end; and providing an antenna module. The antenna module includes: an enclosure defining an enclosure passage extending vertically through the enclosure; and an antenna disposed in the enclosure. The method further includes: mounting the antenna module on the utility pole such that the post extends through the enclosure passage; and mounting an auxiliary device on the upper end of the post.

DETAILED DESCRIPTION

Figure 1:
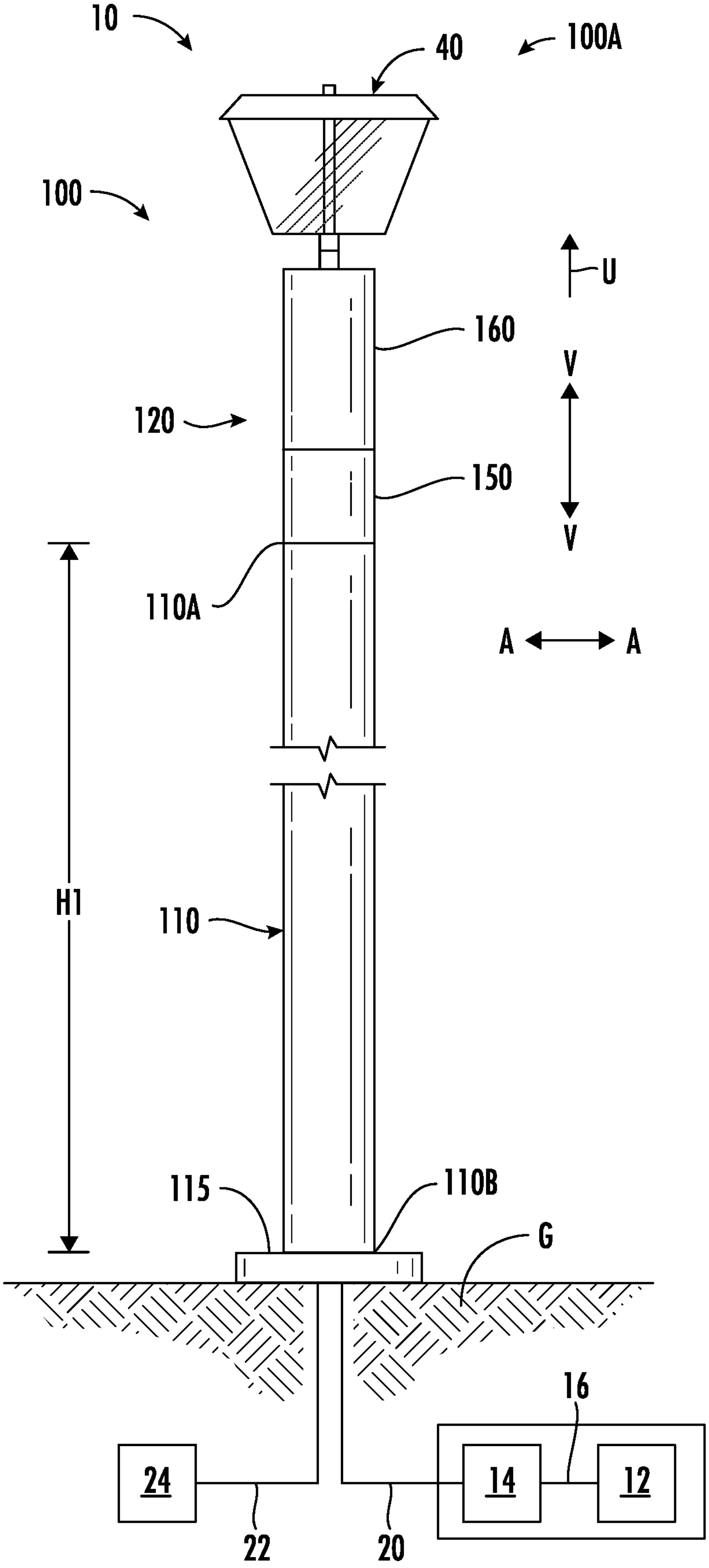
FIG. 1 is a front view of a metrocell base station according to some embodiments.
Figure 2:
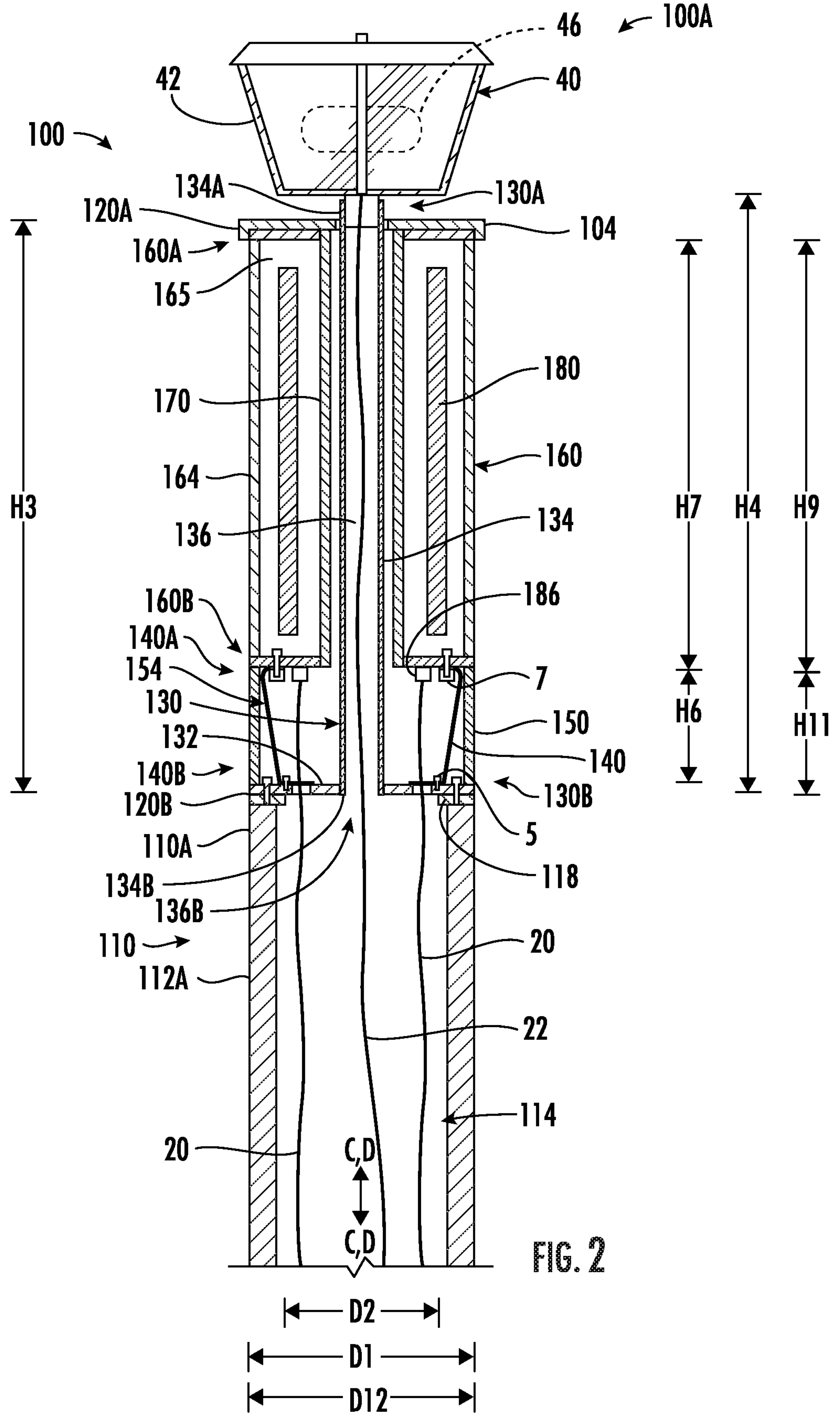
FIG. 2 is an enlarged, fragmentary, cross-sectional view of the metrocell base station of FIG. 1.
Figure 3:
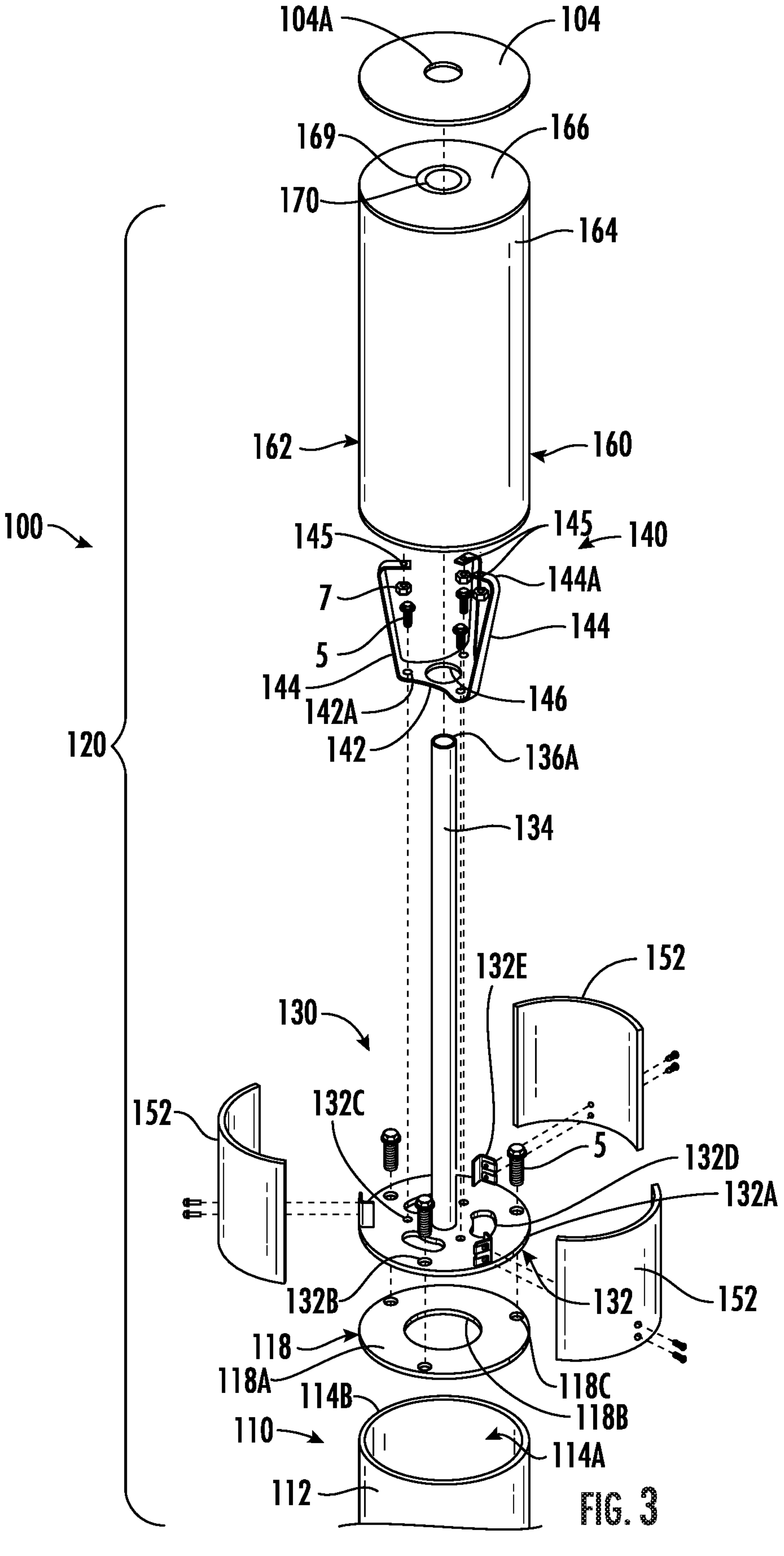
FIG. 3 is an enlarged, fragmentary, exploded, perspective view of a metrocell utility pole assembly forming a part of the metrocell base station of FIG. 1.
Figure 4:
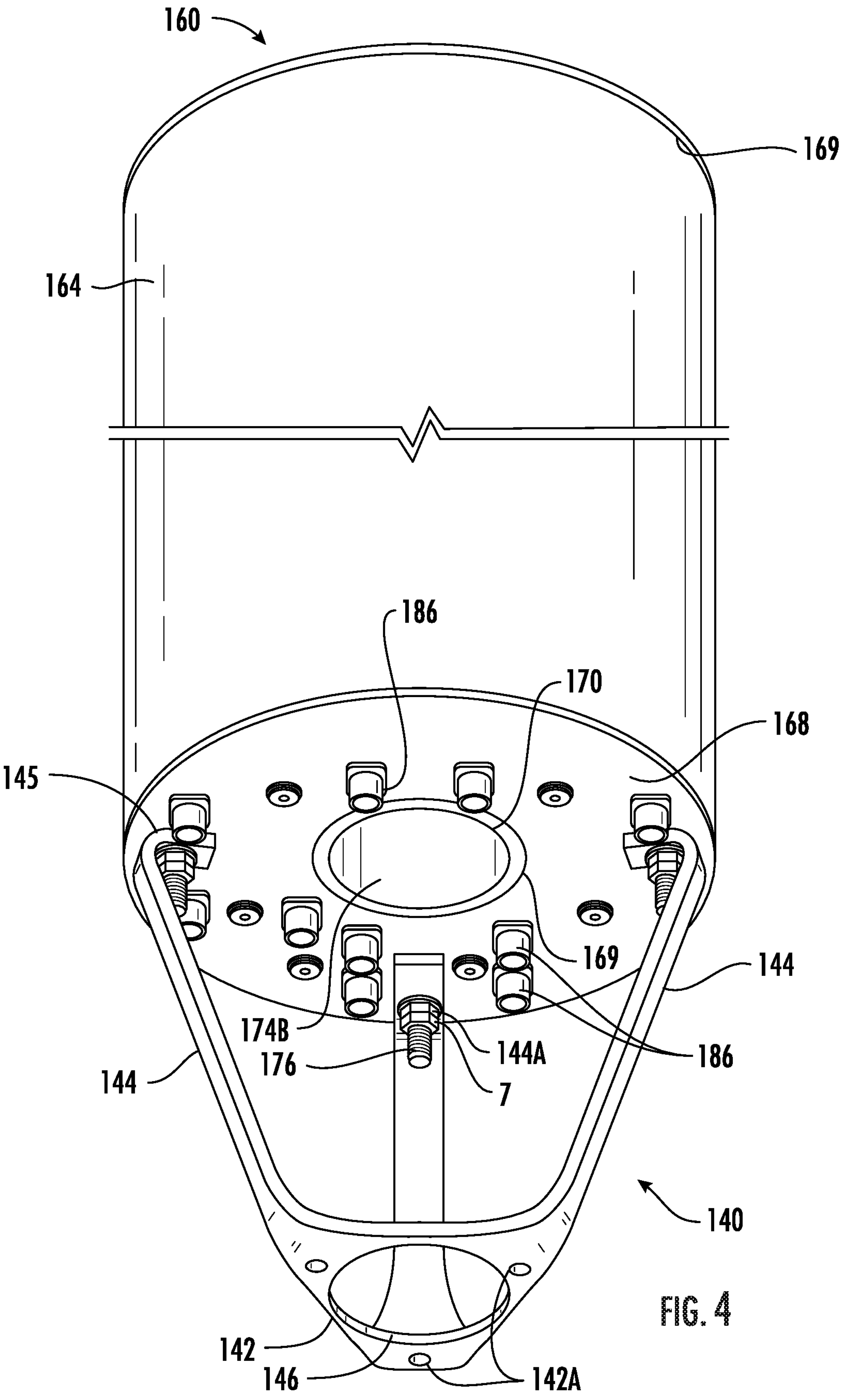
FIG. 4 is a fragmentary, bottom perspective view of a metrocell antenna assembly forming a part of the metrocell utility pole assembly of FIG. 3.

With the recent deployment of fifth generation ("5G") cellular systems, metrocell antennas are now being deployed in much larger numbers and, as a result, suitable mounting locations for metrocell antennas are not available in many locations. If a suitable utility pole is not available, then the metrocell antennas are often mounted further down the utility poles, with the antennas offset to one side of the respective poles. However, zoning ordinances may not allow such offset mounting in some jurisdictions and, even when allowed, the resulting configuration is generally considered to be sub-optimum by wireless operators, because the metrocell antenna is much more prominent (making vandalism more likely) and less attractive, and because the utility pole scatters a portion of the antenna beam generated by the metrocell antenna, which may degrade performance.

With reference to FIGS. 1-6, a metrocell base station 10 according to some embodiments is shown therein. The metrocell base station 10 includes a metrocell utility pole assembly 100, as well as base station equipment such as a baseband unit 12 and a radio 14. The metrocell utility pole assembly 100 includes a utility pole 110, a metrocell antenna assembly 120, and an overhead structural element or auxiliary device 40, as discussed in more detail below. The metrocell antenna assembly 120 includes an antenna 180. The antenna 180 is mounted midpole between the utility pole 110 and the auxiliary device 40.

The metrocell antenna assembly 120 may be any type and construction of metrocell or small cell antenna. This may include any antenna of the type commonly referred to as a metrocell, small cell, picocell, or femtocell, for example. In some embodiments, the coverage range of the metrocell antenna assembly 120 is less than about 1000 meters.

For reference, in the figures vertical is indicated by the arrows V-V, horizontal is indicated by the arrows A-A, and up is indicated by the arrow U.

The utility pole assembly 100 is anchored to and supported by a support structure or surface G. The surface G may be any suitable support such as the ground, a rooftop or other platform.

The baseband unit 12 may receive data from another source such as, for example, a backhaul network (not shown) and may process this data and provide a data stream (via a connection 16) to the radio 14. The radio 14 may generate RF signals that include the data encoded therein and may amplify and deliver these RF signals to the metrocell antenna 180 for transmission via a cabling connection 20. The base station 10 may include various other equipment (not shown) such as, for example, a power supply, back-up batteries, a power bus and the like.

The metrocell base station 10 may include one or more filters configured to reduce the number of cables routed up through the utility pole 110. For example, a first dual triplexer may be provided to reduce the number of cables from 12 to 4, and then a similar second dual-triplexer may be provided just below the antenna module 160 that would separate the signals so that they can be inserted into the correct RF parts 186. In some embodiments, some or all of the filters are contained in the utility pole 110.

The utility pole 110 has an elongate body 112 extending from a lower end 110B to a terminal upper end 110A. The utility pole 110 may be substantially rigidly supported and secured on the base support G by a pole base 115. The utility pole 110 may be tubular and a passage 114 extends upwardly through the utility pole 110 to a top opening 114A. A top edge 114B surrounds the top opening 114A at the upper end 110A. In some embodiments, the passage 114 is centrally located in the utility pole 110.

According to some embodiments, the outer surface of at least an upper section 112A of the pole body 112 (extending downwardly from the upper end 110A) is substantially cylindrical. In some embodiments, the upper section 112A has a length of at least 16 feet. In some embodiments, the substantial entirety of the utility pole 110 from end 110A to end 110B is substantially cylindrical.

In some embodiments, the outer diameter D1 (FIG. 2) of the utility pole 110 at the upper end 110A is in the range of from about 8 to 12 inches. In some embodiments, the outer diameter of the entirety of the upper section 112A is substantially the same as the outer diameter D1.

In some embodiments, the nominal inner diameter D2 (FIG. 2) of the passage 114 is in the range of from about 7.75 to 11.75 inches.

In some embodiments, the height H1 (FIG. 1) of the utility pole 110 is in the range of from about 10 to 25 feet.

The utility pole 110 may be formed of any suitable material(s). In some embodiments, the utility pole 110 is formed of metal. In some embodiments, the utility pole 110 is formed of steel.

The metrocell antenna assembly 120 includes a lower mount bracket 118, a support 130, a spacer bracket 140, an access shroud 150, an antenna module 160, and fasteners 5, 7. The metrocell antenna assembly 120 has an upper end 120A and a lower end 120B. In some embodiments, the height H3 (FIG. 2) from the upper end 120A to the lower end 120B is in the range of from about 18 to 60 inches.

The lower mount bracket 118 includes a body 118A and may take the form of a flat plate. A through hole 118B and circumferentially distributed mount holes 118C are defined in body 118A.

The lower mount bracket 118 is affixed to the upper end 110A of the utility pole 110 (at or adjacent the top edge 114B). The lower mount bracket 118 may be affixed to the upper end 110A using any suitable technique, such as welding or fasteners. In still other embodiments, the lower mount bracket 118 may be omitted and the utility pole 110 may be provided with other mounting structures for securing the support 130 (e.g., bolt holes formed in the utility pole body 112).

The lower mount bracket 118 may be formed of any suitable material(s). In some embodiments, the lower mount bracket 118 is formed of metal. In some embodiments, the lower mount bracket 118 is formed of steel.

The support 130 includes a mounting flange or base 132 and an integral upstanding post 134. The support 130 extends from a lower end 130B to an upper end 130A.

The mounting base 132 includes a body 132A. Circumferentially distributed pole mounting holes 132B, circumferentially distributed antenna mounting holes 132C, and circumferentially distributed pass through holes 132D are defined in the body 132.

The post 134 extends vertically from a lower end 134B (at the mounting base 132) to an upper end 134A (at the upper end 130A). The post 134 is tubular and defines a post through passage 136 extending fully from a lower opening 136B to an upper opening 136A. In some embodiments, the passage 136 is centrally located in the post 134 and support 130.

In some embodiments, the nominal inner diameter D3 (FIG. 5) of the post passage 136 is in the range of from about 2 to 3.5 inches.

In some embodiments, the outer diameter D4 (FIG. 5) of the outer surface 138 of the post 130 is in the range of from about 2.5 to 4 inches.

In some embodiments, the height H4 (FIG. 2) of the post 130 above the mounting base 132 is in the range of from about 34 to 42 inches.

The mounting base 132 may be formed of any suitable material(s). In some embodiments, the mounting base 132 is formed of metal. In some embodiments, the mounting base 132 is formed of steel.

The post 134 may be formed of any suitable material(s). In some embodiments, the post 134 is formed of metal. In some embodiments, the post 134 is formed of steel.

The post 134 may be joined to the mounting base 132 in any suitable manner. In some embodiments, the post 134 is secured to the mounting base 132 such that the post 134 is prevented from tilting about its lower end 134B relative to the mounting base 132. In some embodiments, the post 134 is secured to the mounting base 132 such that the post 134 is prevented from rotating about the vertical axis relative to the mounting base 132. In some embodiments, the post 134 is rigidly affixed to the mounting base 132.

In some embodiments, the post 134 is welded to the mounting base 132. In some embodiments, the post 134 is fastened to the mounting base 132 by fasteners. In some embodiments, the post 134 is secured to the mounting base 132 by integral interlock features of the post 134 and the mounting base 132, such as an external thread on the post 134 received in a threaded bore in the mounting base 132.

The base 132 is seated on the mount plate 118. The support 130 is affixed to the mount plate 118, and thereby to the upper end 110A of the utility pole 110, by fasteners 5 inserted through the holes 132B and the holes 118C.

The spacer bracket 140 extends vertically from a lower end 140B to an upper end 140A. The spacer bracket 140 includes a base 142 from which three integral legs 144 project upwardly. A central opening 146 is defined in the base 142. Each leg 144 includes an integral pad 145 on its upper end. Fastener holes 142A, 144A are provided in the base 142 and each pad 145.

The spacer bracket 140 may be formed of any suitable material(s). In some embodiments, the spacer bracket 140 is formed of metal. In some embodiments, the spacer bracket 140 is formed of steel.

The spacer bracket 140 is affixed to the base 132 of the support 130 by fasteners 5 inserted through the holes 142A and the holes 132A.

In some embodiments, the height H6 (FIG. 2) of the spacer bracket 140 above the mounting base 132 is in the range of from about 5.3 to 6.9 inches.

The antenna module 160 is mounted on the upper end 140A of the spacer bracket 140 and extends vertically from a lower end 160A to an upper end 160B. The antenna module 160 includes an enclosure 162, an antenna 180, radio frequency (RF) connectors 186, and mounting studs 176. In some embodiments and as shown, the antenna module 160 is toroidal or donut-shaped.

In some embodiments, the height H7 (FIG. 2) of the antenna module 160 above the spacer bracket 140 is in the range of from about 12 to 48 inches.

The enclosure 162 includes an outer wall or radome 164, a top end wall 166, a bottom end wall 168, and an inner wall 170. The walls 164, 166, 168, 170 collectively define an enclosed antenna volume or chamber 165. Each of the walls 164, 166, 168, 170 may be formed as an individual component that is connected or mated with the adjoining walls at seams or joints 169. In other embodiments, one or more of the walls 164, 166, 168, 170 may be combined as a single unitary or monolithic component.

The radome 164 is tubular. In some embodiments, the radome 164 is substantially cylindrical. In some embodiments, the radome 164 has a thickness T8 (FIG. 5) in the range of from about 1 to 5 mm.

In some embodiments, the radome 164 has an outer diameter D8 (FIG. 5) in the range of from about 8 to 16 inches. In some embodiments, the outer diameter D8 is substantially the same as the outer diameter D1 of the utility pole 110. In some embodiments, the outer diameter D8 is no more than 2 inches more or less than the outer diameter D1 of the utility pole 110.

The radome 164 may be substantially transparent to RF radiation in the operating frequency band(s) of the metrocell antenna 160 module and may seal and protect internal components the metrocell antenna 160 module from adverse environmental conditions.

The radome 164 may be formed of any suitable material(s). In some embodiments, the radome 164 is formed of polymeric material such as acrylic-styrene-acrylonitrile (ASA) or polyvinyl chloride (PVC). In some embodiments, the radome 164 is formed of fiberglass.

The top end wall 166 is a substantially flat annular member including a central opening 166A. The top end wall 166 may include features 168B for coupling the top end wall 166 to the radome 164 (e.g., using fasteners).

The top end wall 166 may be formed of any suitable material(s). In some embodiments, the top end wall 166 is formed of polymeric material. In some embodiments, the top end wall 166 is formed of ASA, PVC or fiberglass. In some embodiments, the top end wall 166 is formed of metal.

The bottom end wall 168 is a substantially flat annular member including a central opening 168A. The bottom end wall 168 may include features 168B for coupling the bottom end wall 168 to the radome 164 (e.g., using fasteners). The RF connectors 186 extend through connector ports 168C in the bottom end wall 168. In some embodiments, the ports 168C are environmentally sealed. It will be appreciated that the number of RF connectors 186 will vary based on the number of arrays of radiating elements included in the antenna module 160 and the configuration thereof.

The inner wall 170 is tubular. The inner surface 172 of the inner wall 170 defines a through passage 174 that extends vertically through the antenna module 160 from a bottom opening 174B to a top opening 174A. In some embodiments, the inner wall 170 and the passage 174 are substantially cylindrical. In some embodiments, the passage 174 is centrally located in the antenna module 160.

In some embodiments, the inner wall 170 has a thickness T9 (FIG. 5) in the range of from about 1 to 5 mm.

In some embodiments, the inner diameter D9 (FIG. 5) of the passage 174 is in the range of from about 2 to 4 inches.

In some embodiments, the length H9 (FIG. 2) of the passage 174 is in the range of from about 18 to 56 inches. In some embodiments, the length H9 of the passage 174 is substantially the same as the height H7 of the antenna module.

The inner wall 170 may be formed of any suitable material(s). In some embodiments, the inner wall 170 is formed of polymeric material. In some embodiments, the inner wall 170 is formed of PVC, ABS or fiberglass.

The bottom surface of the bottom end wall 168 rests on the pads 145. The studs 176 (e.g., thread studs) are affixed to and project downwardly from the bottom end wall 168. The studs 176 extend through respective ones of the mounting holes 145A and are secured by fasteners 7 (e.g., threaded nuts). The bottom end wall 168 is thereby firmly affixed to the spacer bracket 140.

Figure 5:
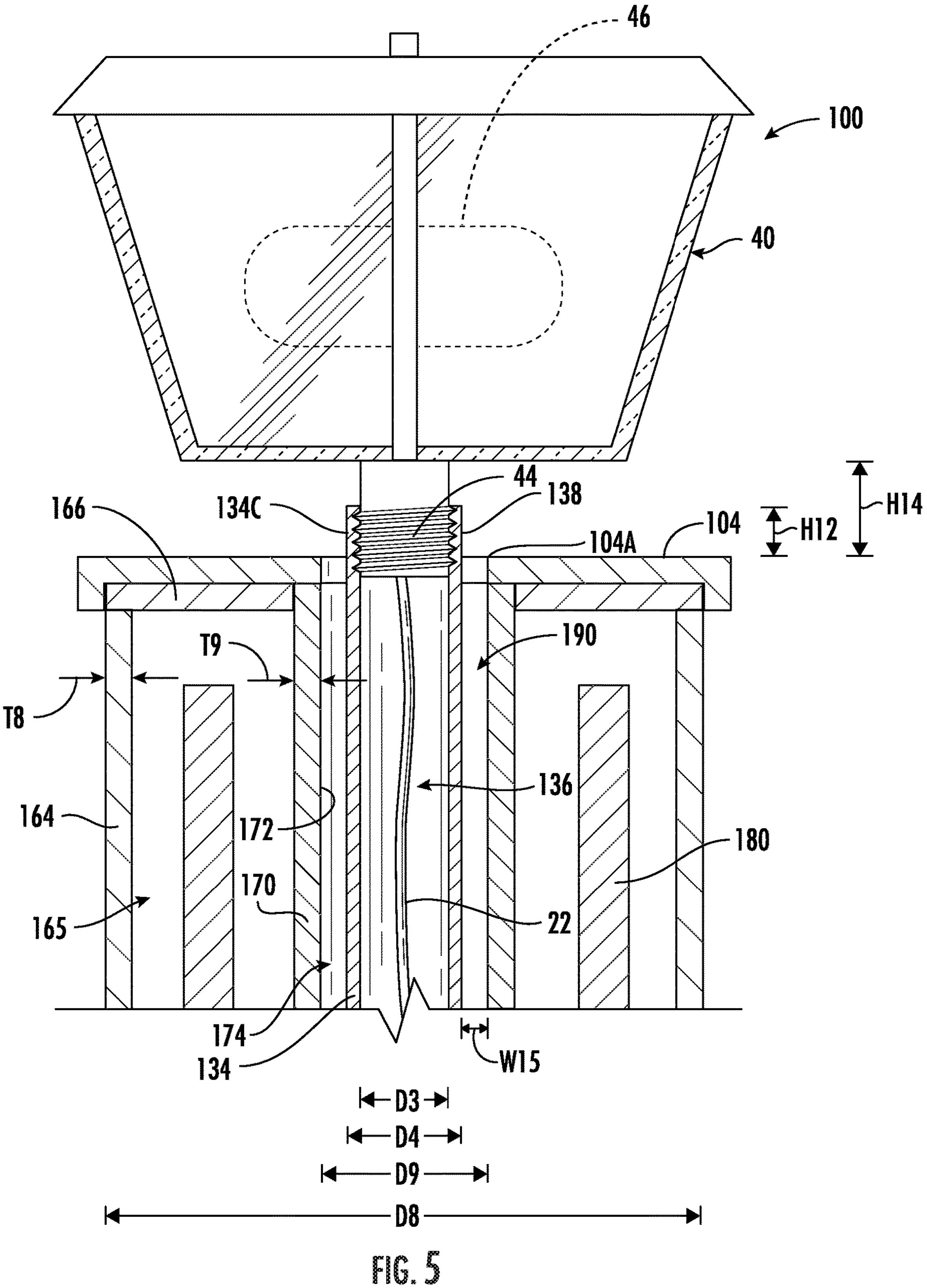
FIG. 5 is an enlarged, fragmentary, cross-sectional view of the metrocell utility pole assembly of FIG. 3.
Figure 6:
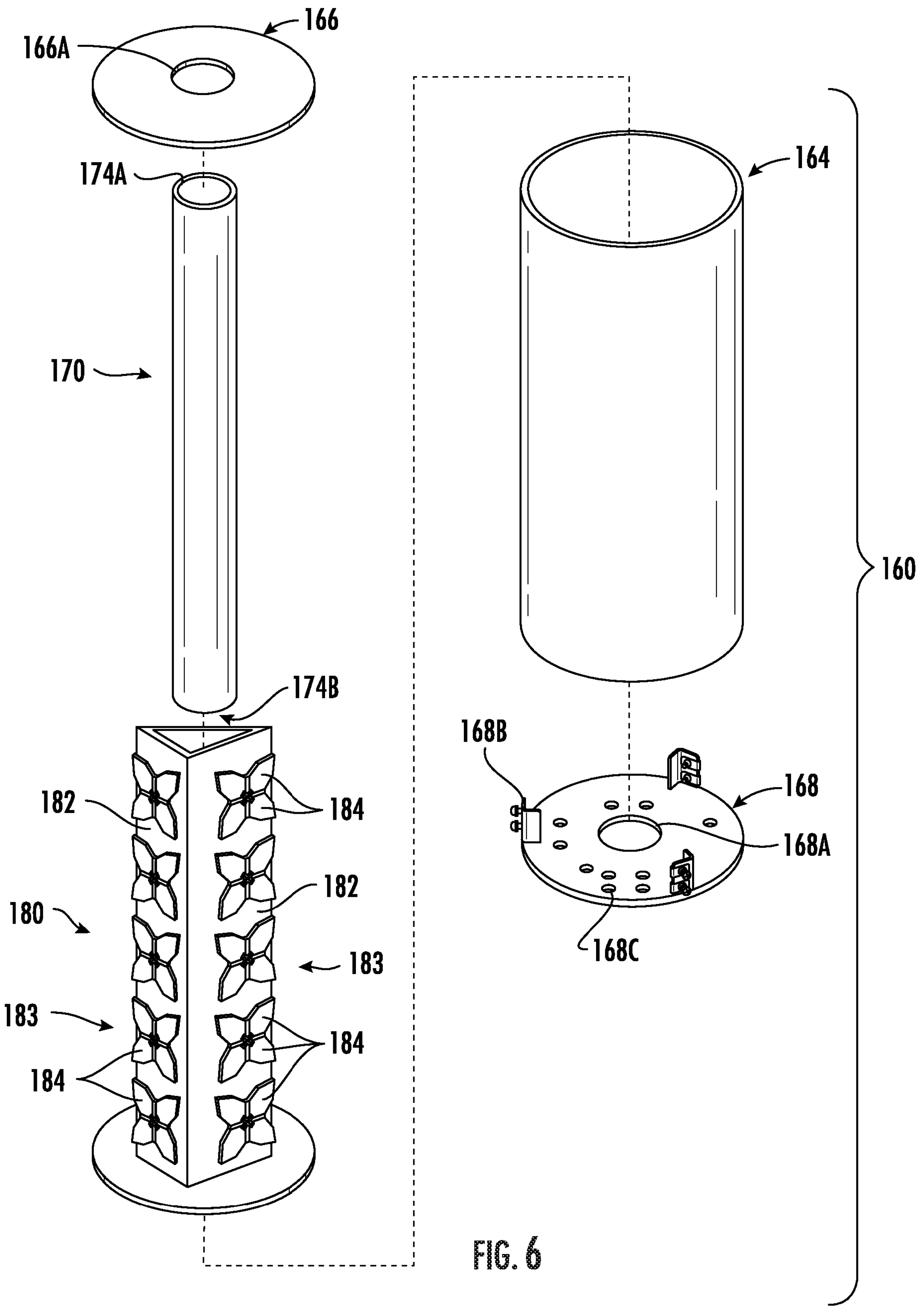
FIG. 6 is an exploded, top perspective view of an antenna module forming a part of the metrocell antenna assembly of FIG. 4.

The post 134 extends upwardly fully through the spacer bracket 140 and the passage 174. An upper end section 134C of the post 134 extends upwardly beyond the upper end 160A of the antenna module 160 a distance H12 (FIG. 5). In some embodiments, the distance H12 is in the range of from about 2 to 6 inches.

In some embodiments, the chamber 165 is toroidal or donut-shaped. In some embodiments, the chamber 165 is environmentally sealed to substantially prevent ingress of water into the chamber from the surrounding environment. Each of the joints 169 may be sealed seams. For example, joints 169 may be glued, welded or otherwise bonded.

The antenna 180 is provided as an antenna subassembly housed or contained within the chamber 165 of the cylindrical enclosure 162. The antenna assembly 180 may include one or more reflector panels 182, and may also include one or more support brackets (not shown) that provide added structural rigidity to the reflector panels 182. Each reflector panel 182 may comprise a generally planar metal sheet that extends vertically within the antenna module 160. The reflector panels 182 may collectively define a tube the circumferentially surrounds the passage 174.

The antenna assembly 180 may include one or more vertically-oriented linear arrays 183 of radiating elements 184, which may be mounted to extend outwardly from each reflector panel 182. In the depicted embodiment, each radiating element 184 is implemented as a dual polarized slant −45°/+45° cross dipole radiating element that includes a first dipole radiator that is mounted at an angle of −45° with respect to the plane defined by the horizon and a second dipole radiator that is mounted at an angle of +45° with respect to the plane defined by the horizon. As is well understood by those of skill in the art, a first RF signal may be fed to the first dipole radiators of one or more of the linear arrays 183 in order to generate a first antenna beam that has a −45° polarization, and a second RF signal may be fed to the second dipole radiators of one or more of the linear arrays 183 in order to generate a second antenna beam that has a +45° polarization. The first and second antenna beams may generally be orthogonal to each other (i.e., non-interfering) due to the orthogonal polarizations of the antenna beams.

In some embodiments, the antenna 180 is designed to have an omnidirectional antenna pattern in the azimuth plane, meaning that at least one antenna beam generated by the antenna 180 may extend through a full 360 degree circle in the azimuth plane. The linear arrays 183 of radiating elements 184 may be vertically-oriented. The linear arrays 183 of radiating elements 184 may be circumferentially distributed around the passage 174.

It will be appreciated that antenna subassembly 180 represents just one of many different configurations of linear arrays of radiating elements that may be included in the metrocell antenna modules 160 according to embodiments of the present invention, and hence the metrocell antenna 180 will be understood to simply represent one example embodiment.

The access shroud 150 includes a plurality (as shown, three) of shells 152. The shells 152 collectively form a tubular assembly having a cylindrical outer profile. The shells 152 are releasably coupled to one another and to the attachment features 132E of the support 130 by fasteners 5 that extend through holes 152A in the shells 152.

The cylindrical access shroud 150 has a height H11 (FIG. 2) that spans the distance from the upper end 110A of the utility pole 110 to the lower end 160B of the antenna module 160. The cylindrical access shroud 150 circumferentially surrounds an access volume 154. The access volume 154 contains the spacer bracket 140 and the RF connectors 186. The access volume 154 also is contiguous with and communicates with the openings 146, 174B.

In some embodiments, each shell 152 has a thickness in the range of from about 1 to 5 mm.

In some embodiments, the access shroud 150 has an outer diameter D12 (FIG. 2) in the range of from about 8 to 16 inches. In some embodiments, the outer diameter D12 of the access shroud 150 is substantially the same as the outer diameter D1 of the utility pole 110. In some embodiments, the outer diameter D12 is no more than 2 inches more or less than the outer diameter D1 of the utility pole 110.

The shells 152 may be formed of any suitable material(s). In some embodiments, each shell 152 is formed of a polymeric material. In some embodiments, each shell 152 is formed of fiberglass reinforced composite.

The auxiliary device 40 may be a luminaire. The luminaire 40 includes a housing 42, a mounting feature 44, and a lamp 46 in the housing 42. The luminaire 40 may further include additional lamps, as well as parts to distribute light, position and protect the lamp, monitor and/or control operation of the luminaire (e.g., a photodetector and/or timer), or connect and/or condition power supplied to the luminaire. The luminaire 40 is only illustrative and it will be appreciated that the luminaire 40 may take other forms and may include other components and combinations of components. The lamp or lamps may be any suitable type of lamp (e.g., LED, CFL, halogen, or incandescent).

The luminaire 40 is affixed to the top end section 134C of the post 134 by the mounting feature 44. The luminaire 40 resides above the antenna module 160.

The metrocell utility pole assembly 100 may be constructed and used as follows in accordance with some embodiments. Some or all of the assembly steps may be executed onsite (i.e., at the location of final installation) or some of the steps may be executed at the manufacturer's facility (i.e., the metrocell utility pole assembly 100 may be pre-assembled in whole or in part). The order of the steps of assembly may differ from the order described below.

The utility pole 110 is mounted on the support surface G using any suitable technique.

One or more antenna feed cables 20 are routed through the passage 114 to the top opening 114A. The antenna feed cables 20 are operably connected to the radio 14.

One or more auxiliary cables 22 are also routed through the passage 114 to the top opening 114A. The auxiliary cable(s) 22 is/are operably connected to a remote station or stations 24 associated with the operation of the auxiliary device 40. In some embodiments, an auxiliary cable 22 is a power supply cable for the luminaire 40 connected to a power supply 24. In some embodiments, an auxiliary cable 22 is a data transmission cable connected to a computer or recorder 24.

The mount plate 118 is affixed on the upper end 110A.

The base 132 of the support 130 is then affixed to the mount plate 118 using fasteners 5 through the mount holes 118C and 132C.

The spacer bracket 140 is slid down the post 134 (which is received in the opening 146 until the base 142 rests on the base 132. The base 142 is affixed to the base 132 using fasteners 5.

The post 134 is inserted into the inner passage 174 of the antenna module 160. The antenna module 160 is slid down the post 134 until the studs 176 are inserted through the holes 145A and the bottom wall 168 rests on the pads 145 of the spacer bracket 140. The antenna module 160 is then affixed to the pads 145 using the nuts 7 on the studs 176. The post 134 extends fully through the inner passage 174 and the top section 134C of the post 134 projects upwardly beyond the upper end 160A of the antenna module 160.

Before or after mounting and securing the antenna module 160 on the spacer bracket 140, the antenna feed cables 20 are routed through the pole top opening 114A, the mount plate opening(s) 118B, one or more of the support base openings 132D, and the access volume 154 within the spacer 140, and connected to respective ones of the RF connectors 186. If the antenna module 160 is affixed onto the spacer bracket 140 first, the user can conveniently access the volume 154 through the spaces between the legs 144 to make the connections.

Additionally, the auxiliary cable(s) 22 are routed through the pole top opening 114A, the mount plate opening 118B, the spacer bracket opening 146, the access volume 154, the post inner passage 136, and the post top opening 136A. Accordingly, the post passage 136 provides a dedicated, protective conduit for the auxiliary cable(s) 22.

The shells 152 are affixed to the support 130 and one another to form the shroud 150 surround and enclosing the spacer bracket 140 and the access volume 154.

In some embodiments, the metrocell utility pole assembly 100 is provided with a top cap or cover 104 that is installed over the top end wall 166 of the antenna module 160. The top end section 134C of the post 134 extends through an opening 104A in the cover 104.

The auxiliary cable(s) 22 are connected to the luminaire 40. The mounting feature 44 of the luminaire 40 is secured to the upper end 134B of the post 134 to securely mount the luminaire 40 on the post 134. In some embodiments, the luminaire 40 is rigidly mounted on the post 134.

In some embodiments, the luminaire 40 is supported or suspended above the antenna module 160 a distance H14 (FIG. 5) so that the luminaire 40 does not contact the antenna module 160.

Accordingly, in some embodiments and as shown, the auxiliary device 40 (e.g., the luminaire) is mounted and located on the terminal upper end 130A of the post 134. And, in some embodiments and as shown, the auxiliary device 40 (e.g., the luminaire) is located on the terminal upper end of the metrocell antenna assembly 120. In some embodiments and as shown, the auxiliary device itself forms the terminal upper end 100A of the utility pole assembly 100.

Following assembly, one or more of the shells 152 of the shroud 150 may be removed to provide access to the access the access region 154. The user may use this access to adjust or maintain the antenna feed cable connections, for example. The removed shell(s) 152 can then be re-installed to reassemble the access shroud 150.

The lower end 160B of the antenna module 160 is secured to the terminal upper end 110A of the utility pole 110 through the rigid connections between the bottom end wall 168, the spacer bracket 140, the post base 132, and the mount plate 118. In some embodiments, the antenna module 160 is only secured to the utility pole 110 through this connection. That is, the only connection between the antenna module 160 and the utility pole 110 is through the spacer bracket 140 and below the enclosure 162.

In some embodiments and as shown, the antenna module 160 is not attached to the support 130 in the inner passage 174 or above the antenna module 160. In some embodiments, the inner surface 172 of the inner wall 170 is spaced apart from the outer surface 138 of the post 134 along the full width and full circumference of the inner passage 174 so that an annular gap 190 is defined between the inner wall 170 and the post 134 along the full length of the enclosure 162. The relative sizes and shapes of the inner wall 170 and the post 134 thus provide a clearance fit therebetween rather than an interference fit. In some embodiments, the gap 190 has a nominal width W15 (FIG. 5) of at least 1 mm and, in some embodiments, in the range of from about 2 to 20 mm.

Thus, in some embodiments, the antenna module 160 is mounted as a vertical cantilever from the upper end 110A of the utility pole. The remainder of the antenna module 160 is structurally independent of the post 134.

The antenna module 160 is non-load bearing. In some embodiments, the antenna module 160 does not in any way physically or structurally support the structures above the antenna module 160 that are supported by the post 134. In particular, the antenna module 160 does not bear the load of the luminaire 40. The axial load of the luminaire 40 is instead borne by the post 134 and, because the antenna module 160 is only connected to the support 130 below the antenna module 160, the axial load is not transferred to the antenna module 160. Similarly, lateral loads on the luminaire 40 (e.g., caused by wind) are borne by the post 134.

Because the post 134 is separated from the antenna module 160 by the annular gap 190 within the inner passage 174 and the relative positions of the post 134 and the inner wall 170 are substantially fixed by their coupling at the spacer bracket 140, lateral deflections and vibrations of the post 134 typically will not be transferred to the antenna module 160. As a result, the performance of the antenna 180 will not suffer performance degradation (e.g., PIM) from such mechanical distortions.

The metrocell utility pole assembly 100 can provide a desirable appearance and blend in well with its environmental surroundings. In some embodiments and as illustrated, the central axis C-C (FIG. 2) of the antenna module 160 is substantially coincident with the central axis D-D of the utility pole 110. In some embodiments and as illustrated, the outer diameters D8, D12 and D1 of the antenna module 160, the access shroud 150, and the utility pole 110 are substantially the same. The outer diameter D3 of the post 134 is substantially smaller than the outer diameter D12 of the utility pole 110, which allows the antenna module 160 to contain the antenna 180 while still having an outer diameter D8 the same or approximately the same as the utility pole outer diameter D12. As a result, the antenna module 160 is visually well-integrated with the utility pole to give the appearance of a single continuous pole structure.

The metrocell utility pole assembly 100 can be conveniently installed on site. The components 110, 118, 130, 140, 160 and 40 can be sequentially assembled such that the assembled structure at each step is self-supporting. Provision is made for convenient access to the antenna connectors 186 even after the antenna module 160 is mechanically mounted. The luminaire 40 can be installed independently of the antenna module 160. Because the metrocell antenna assembly 120 is mounted on the terminal upper end 110A of the utility pole 110, it can be conveniently installed and effectively aesthetically integrated into the metrocell utility pole assembly 100.

As described above, in some embodiments, the post 134 is formed of metal and the inner wall 170 is formed of a non-electrically conductive polymeric material. In this case, the metal post 134 can provide upper side lobe suppression. As a result, the inner wall 170 need not be constructed to provide this function and can be configured primarily to prevent ingress of moisture into the enclosure chamber 165.

As discussed herein, in accordance with some embodiments, the antenna module 160 does not structurally support the overlying structure of the metrocell utility pole assembly 110 (i.e., the auxiliary device 40). As a result, the antenna module 160 will not undergo stress from loads from and on the auxiliary device 40. Such stress loads, if permitted, may cause damage to the antenna and/or movement in the antenna module 160 and/or the connections thereto. Such damage and movement may cause passive intermodulation (PIM) distortion.

The introduction of PIM is also prevented or reduced by the use of a polymeric bottom end wall 168 of the antenna module 160.

Because the antenna module 160 is not used to support the components above it, the inner wall 170 can be formed of a material (e.g., a non-electrically conductive polymer or plastic) that is relatively weak but well-suited to seal the enclosure against moisture.

It is desirable to make the diameter of the passage 174 in the enclosure 162 as large as feasible while maintaining the outer diameter of the antenna module 160 within the desired range and providing sufficient volume within the antenna module 160 for the antenna 180 and other components. This allows the use of a post 134 having a larger outer diameter. The larger outer diameter of the post 134 enables the post 134 to support a greater structural load and (by increasing the inner diameter of the post 134) accommodate a greater number or size of cables (e.g., cable 22) routed through the post 134. Typically, the hole 146 in the spacer bracket 140 and the passage 174 will have substantially the same diameter, as these two holes must receive the post 134.

While the auxiliary device 40 has been shown and described herein as a luminaire, other types of auxiliary devices may be incorporated into metrocell utility pole assemblies in place of or in addition to the luminaire, according to other embodiments.

Figure 7:
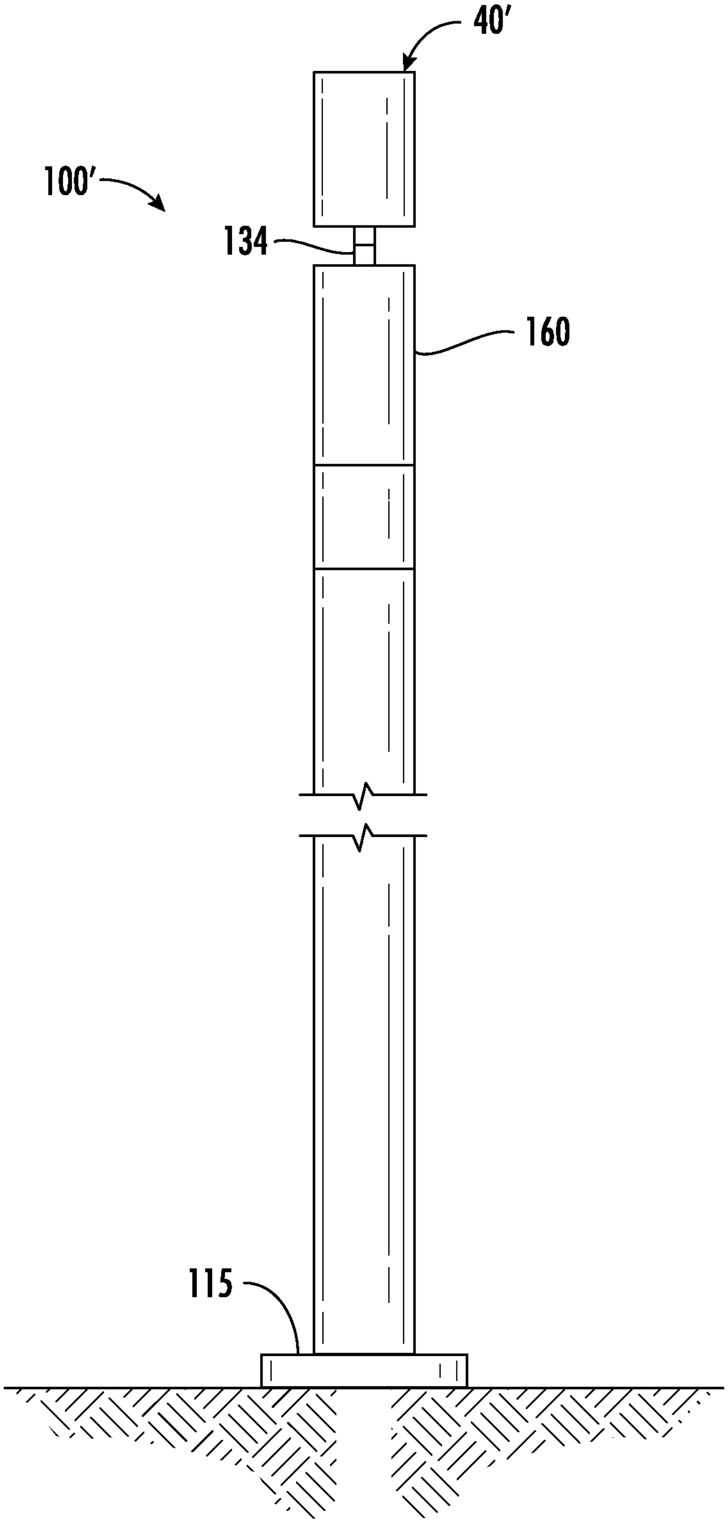
FIG. 7 is a front view of a metrocell utility pole assembly according to further embodiments.

In some embodiments, the auxiliary device is one or more additional metrocell antenna modules. For example, FIG. 7 shows a metrocell utility pole assembly 100' including a second antenna module 40' supported by the post 134 above the antenna module 160. The cabling routed through the post passage 136 (not shown in FIG. 7) may include an antenna feed cable connected to the second antenna module 40'. The metrocell utility pole assembly 100' may be otherwise constructed and used in the same manner as the metrocell utility pole assembly 100.

In some embodiments, the auxiliary device 40 is or includes a radio. In some embodiments, the auxiliary device 40 is or includes communications equipment. In some embodiments, the auxiliary device 40 is or includes a filter (e.g., RF filter). In some embodiments, the auxiliary device 40 is an ornamental structure or feature.

The fasteners 5 and 7 as described herein may be any suitable fastener devices, such as bolts and nuts.

The metrocell antennas according to embodiments of the present invention may be aesthetically pleasing and, because the antenna directs the antenna beams away from the support structure, scattering effects due to interference from the support structure may be eliminated.

While the radio 14 is shown as being co-located with the baseband equipment 12 at the bottom of the utility pole 110, it will be appreciated that the radio 14 may alternatively be mounted on the utility pole 110 or elsewhere.

While the metrocell antennas described above include RF ports in the form of RF connectors that are mounted in the base plates of the first and/or second enclosures of the antenna, it will be appreciated that other RF port implementations may alternatively or additionally be used. For example, "pigtails" in the form of connectorized jumper cables may extend through openings in the first and/or second enclosures and may act as the RF ports included in any of the above-described embodiments of the present invention.

The present invention has been described above with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams.

That which is claimed:

1. A metrocell utility pole assembly comprising:

a utility pole having an upper end;

an auxiliary device; and a metrocell antenna assembly including:

a support mounted on the upper end of the utility pole, the support including an elongate post having a post upper end, wherein the elongate post extends upwardly from the upper end of the utility pole to the post upper end;

an antenna module including an enclosure defining an enclosure passage extending vertically through a center of the enclosure, and an antenna disposed in the enclosure, a mounting bracket coupling a lower end of the enclosure to the upper end of the utility pole, and an access shroud removably mounted on the metrocell antenna and surrounding the mounting bracket, wherein the elongate post extends through the enclosure passage, the elongate post is tubular and defines a post passage extending therethrough, the auxiliary device is mounted on the upper end of the elongate post, and the metrocell utility pole assembly includes an auxiliary cable extending through the post passage to the auxiliary device, and wherein the support includes a mounting base coupled to the post, and the mounting base is secured to the upper end of the utility pole to affix the post to the utility pole.

2. The metrocell utility pole assembly of claim 1 wherein the auxiliary device is mounted on the upper end of the post above the antenna module.

3. The metrocell utility pole assembly of claim 1 wherein the auxiliary device includes a lamp.

4. The metrocell utility pole assembly of claim 1 wherein the auxiliary device includes a luminaire.

5. The metrocell utility pole assembly of claim 1 wherein the auxiliary device includes a second antenna.

6. The metrocell utility pole assembly of claim 1 wherein the auxiliary device includes a device selected from the group consisting of a radio, communications equipment, a filter, and an ornamental structure.

7. The metrocell utility pole assembly of claim 1 wherein:

the antenna module includes upper and lower opposed ends; and only the lower end of the antenna module is secured to the utility pole and/or the support.

8. The metrocell utility pole assembly of claim 7 wherein an outer diameter of the post and an inner diameter of the enclosure passage are relatively configured such that an annular gap is defined between the post and the enclosure.

9. The metrocell utility pole assembly of claim 1 wherein:

the utility pole has an outer diameter adjacent the antenna module;

the antenna module has an outer diameter; and the outer diameters of the utility pole and the antenna module are substantially the same.

10. The metrocell utility pole assembly of claim 1 wherein the mounting bracket couples the lower end of the enclosure to the upper end of the utility pole such that the lower end of the enclosure and the upper end of the utility pole are axially spaced apart to define an access volume between the lower end of the enclosure and the upper end of the utility pole.

11. The metrocell utility pole assembly of claim 10 wherein the metrocell antenna assembly includes an access shroud covers the access volume.

12. The metrocell utility pole assembly of claim 11 wherein:

the utility pole has an outer diameter adjacent the access shroud;

the antenna module has an outer diameter;

the access shroud has an outer diameter; and the outer diameters of the utility pole, the antenna module, and the access shroud are substantially the same.

13. The metrocell utility pole assembly of claim 1 including an antenna feed cable extending through the utility pole to the antenna module.

14. The metrocell utility pole assembly of claim 13 including an RF connector on a bottom wall of the enclosure, wherein the antenna feed cable is connected to the RF connector.

15. The metrocell utility pole assembly of claim 1 wherein the post is formed of metal.

16. The metrocell utility pole assembly of claim 1 wherein:

the enclosure forms an environmentally sealed chamber; and the antenna is disposed within the environmentally sealed chamber.

* * * * *